Oct. 11, 1949.  H. A. RAHMEL  2,484,734
APPARATUS FOR DETERMINING THE LISTENING HABITS
OF WAVE SIGNAL RECEIVER USERS
Filed Feb. 11, 1948  3 Sheets-Sheet 1

INVENTOR.
Henry A. Rahmel
BY Mason & Hyps
Attys.

Oct. 11, 1949.  H. A. RAHMEL  2,484,734
APPARATUS FOR DETERMINING THE LISTENING HABITS
OF WAVE SIGNAL RECEIVER USERS
Filed Feb. 11, 1948  3 Sheets-Sheet 3

INVENTOR.
Henry A. Rahmel
BY
Attys.

Patented Oct. 11, 1949

2,484,734

UNITED STATES PATENT OFFICE 2,484,734

APPARATUS FOR DETERMINING THE LISTENING HABITS OF WAVE SIGNAL RECEIVER USERS

Henry A. Rahmel, Evanston, Ill., assignor to A. C. Nielsen Company, Chicago, Ill., a corporation of Illinois Application February 11, 1948, Serial No. 7,648

6 Claims. (Cl. 346—37)

The present invention relates to apparatus for determining the listening habits of wave signal receiver users. More particularly the present invention is concerned with apparatus for making a record with respect to time of the tuning condition of wave signal receivers located in predetermined homes which includes making such a record for all the receivers disposed in the particular homes under consideration even though such homes are multi-receiver homes and also if desired producing records at a central point with respect to the receivers in a plurality of homes.

In recent years numerous arrangements have been suggested for recording the listening habits of wave signal receiver users, whereby with instrumented methods a continuous record of the transmitting stations to which a wave signal receiver is tuned may be made, and from which it is readily possible to analyze the listening habits of such users and prepare reliable information with respect to such listening habits.

It will be understood that in such instrumented methods for determining the listening habits of wave signal receiver users, the receivers in a large number of homes are metered or monitored to afford the basic information from which the analysis can be made. From this basic information a statistical analysis of the various factors affecting the sales effectiveness of particular radio programs may be arrived at. In such a system employing apparatus for recording the listening habits of wave signal receiver users it is contemplated that the selection of the system collaborator homes, that is, the homes in which radio receiver use is to be logged—shall be on a basis such that all of the various factors affecting any process of sampling public opinion, such, for example, as the number of potential listeners, religion, economic affluence, etc., are accounted for on a weighted basis.

Instrumented methods for determining the listening habits of home radio receiver users generally involve the use of a recording device operating in conjunction with each collaborator receiver used in the sampling system to record the extent of use of the receiver and to record as a function of time the wave signal transmitter to which the receiver is tuned for program reception. The usual device of this character embodies facilities for driving a movable recording or record receiving element such as a movable paper tape, magnetic tape or wire or other recording tape or medium in a predetermined manner together with translating means for variably positioning suitable recording means such as a stylus or the like relative to the recording element in accordance with changes of the tuning of the wave signal receiver. If the recording element moves at a constant speed or in some determinable relationship with respect to time, the record on the recording element not only provides information as to the particular transmitting station or stations to which the receiver is tuned, but also gives accurate information with reference to the time such receiver is tuned to such various transmitting stations.

In general two different types of instrument have been used to produce a record of the extent of receiver use and the particular transmitters to which the receiver is tuned for program reception during a predetermined calendar period. The first or all mechanical type of device employs a mechanical connection between the control means for operating the resonant frequency varying device (which control means might be the tuning shaft of the ganged condensers of a receiver), and the recording stylus of the recorder. The recording stylus is moved transversely of the recording element in accordance with the angular setting imparted to the condenser tuning shaft whereby a record of the particular tuning condition of the receiver is obtained. If the tape is driven at a constant speed then a record of the tuning condition with respect to time is obtained. The connection between the recording means such as the stylus and the receiver tuning shaft dictates the positioning of the recorder in the receiver cabinet which bars its use in connection with small receivers having limited unoccupied cabinet space.

The second type of such instrument used heretofore might be termed an electro-mechanical device, in that an electro-mechanical translating system is interposed between the high frequency signal channel of the receiver and the station recording stylus, to control the movement of the stylus in its operation to record on a time basis the particular transmitters from which programs are received. Generally such a device requires a connection with the local oscillator of receivers of the superheterodyne type and is not adaptable for use with receivers other than the superheterodyne type. Furthermore this type of device generally requires accurate frequency measuring apparatus to be located at the receiver. Such apparatus generally is bulky in the first place and in the second place is usually quite delicate and consequently should not be subjected to jars or the like which it might receive through movement, for example, of the wave signal receiver when re-arranging the furniture in a particular room where the receiver is located.

It would be desirable to provide apparatus for producing a record of the extent of receiver use which is applicable to any type of receiver whether of the superheterodyne type or not. It would furthermore be desirable that any apparatus which must be installed at the receiver be simple and compact so as to be applicable to substantially all receivers regardless of size. The recording and translating equipment for producing a record of the tuning condition of the receiver should be capable of being located remotely from the receiver such for example as in the basement or a closet of a home without the requirement of special electrical or mechanical connections between the receiver and such recording apparatus. In many cases it may be desirable to have the recording equipment located at a central office to record information from a plurality of homes which can be accomplished by employing suitable links such as telephone wires or space links employing beamed ultra high frequency radio waves. It is furthermore desirable that a single recording and translating unit should be capable of recording the tuning conditions of all the wave signal receivers in a single home (in the event that the recorder is located at a central office a single recording device may be used to record the tuning condition of the receivers in a plurality of homes) while still giving complete information with respect to each receiver.

It will be understood that in any particular locality the number of transmitting stations to which a wave signal receiver is generally tuned is fairly limited. One factor which limits the number of transmitting stations to which a receiver is tuned is of course the relative range of the receiver. Another factor is the relative range of the transmitting station. In addition the advantageous reception obtainable from a finite number of stations over the reception of other stations which might be tuned in but whose transmitting characteristics are not too favorable for good program reception mitigates against tuning the receiver to more than a limited number of transmitters. Furthermore, with the present networks whereby the identical programs are carried by numerous stations it is rare indeed when a receiver is tuned to other than a limited number of transmitting stations. It would be desirable therefore to provide a simplified arrangement which will provide for recording in a manner which can readily be decoded the tuning condition of a wave signal receiver to a plurality of predetermined stations which would include all those stations to which the receiver is likely to be tuned together with additional information which would indicate the time that a receiver is tuned to stations other than the finite number of stations to which the receiver is normally tuned. It will be understood that if the wave signal receiver is tuned to stations other than the finite number for a substantial period of time that some of such other stations should be included within the finite number.

In apparatus commonly employed heretofore the transverse position of a trace or record on a recording element such as a tape was indicative of the tuning condition of the receiver. It will be understood that due to the apparent variable band width of transmitting frequencies received at the wave signal receiver that certain stations can be tuned in over a considerable area of the tuning scale whereas others are confined to a very narrow area. This has complicated matters from the standpoint of decoding such records or tapes and it would be desirable to provide an arrangement in which the traces on the tape appear in narrowly confined channels equally spaced from one another thereby greatly to facilitate the decoding operation.

Accordingly it is an object of the present invention to provide a new and improved apparatus for recording the listening habits of wave signal receiver users.

It is a further object of the present invention to at least in part obviate the above mentioned disadvantages of prior art systems and apparatus for recording the tuning condition of one or more wave signal receivers.

It is another object of the present invention to provide improved apparatus of the character described for recording information with respect to the tuning conditions of a plurality of wave signal receivers with a relatively small amount of apparatus the bulk of which is located at a point remote from the receivers while the apparatus located at the receivers is of such small size as to be capable of being disposed within the available cabinet space of substantially all types of receivers.

It is another object of the present invention to provide a new and improved apparatus of the character referred to above having all of the advantages enumerated above.

Still another object of the present invention is to provide an apparatus employing a single record receiving element for recording information with respect to the tuning condition of a plurality of remotely located wave signal receivers with the information recorded in the form of traces disposed in uniformly spaced channels so as to be readily decoded.

A still further object of the present invention is to provide new and improved apparatus wherein a proper record of the tuning condition of one or more wave signal receivers is made regardless of how the receivers are tuned to the various channels of interest.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Figure 1A:
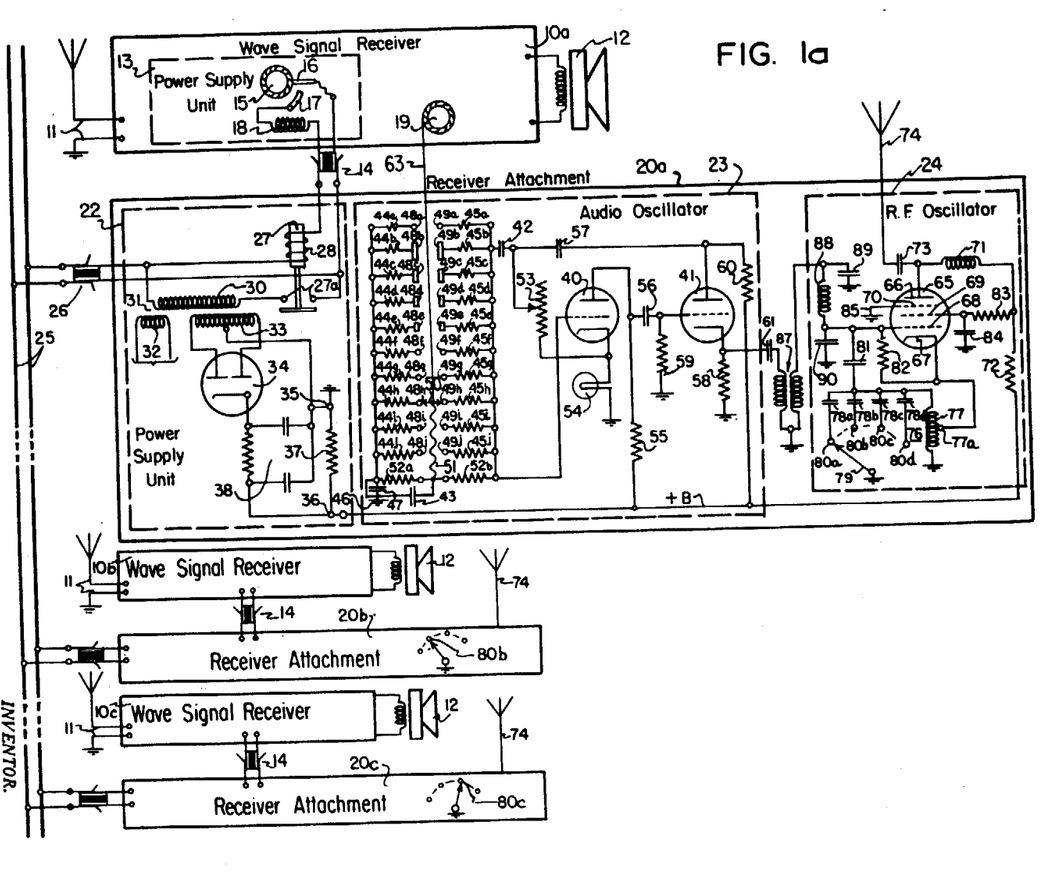
Figs. 1a and 1b are diagrammatic illustrations showing first and second portions of a system and apparatus employing the present invention arranged so as to be united into a single disclosure.
Figure 1B:
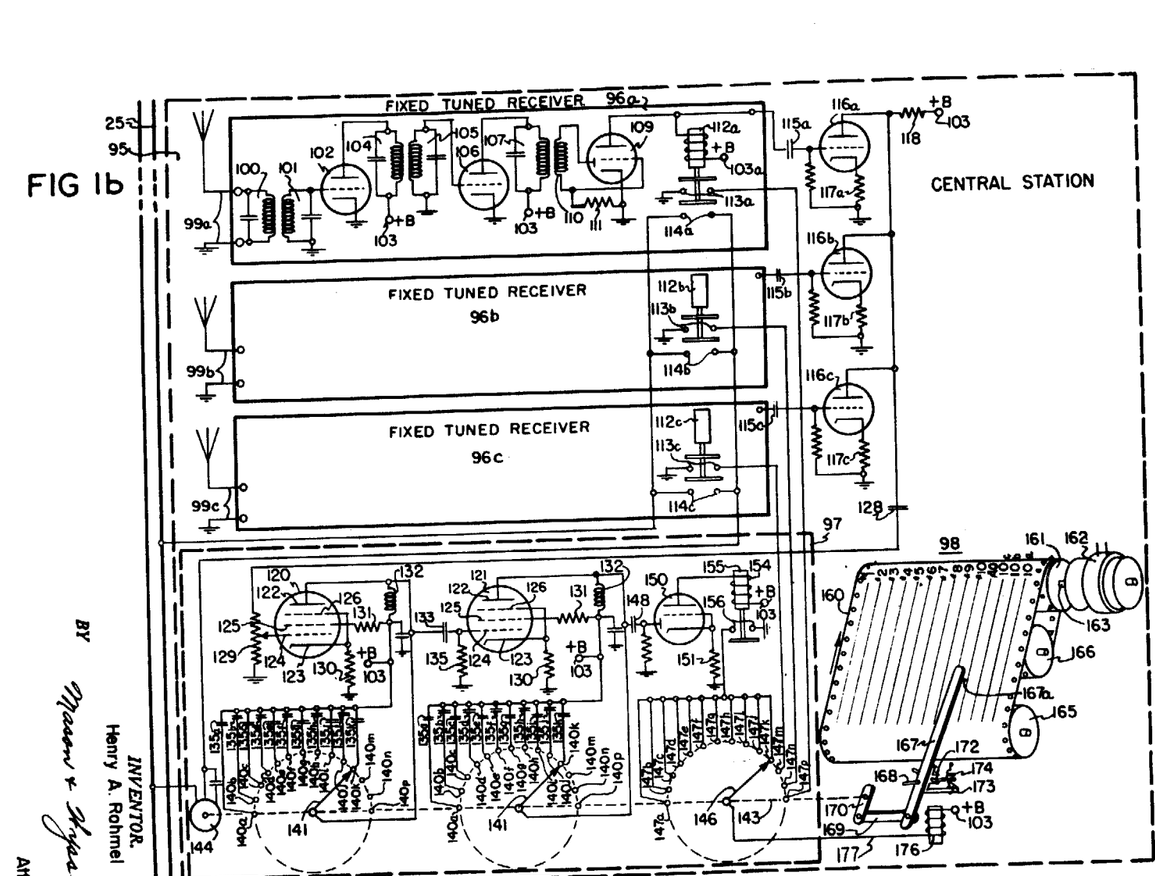

It will be understood that the present invention is equally applicable to homes employing only a single wave signal receiver or to homes having a plurality of receivers. It will furthermore be understood that the sample of homes from which the statistical analysis is to be obtained is determined without knowledge of the number of receivers disposed therein. Consequently it is essential for the apparatus to be equally capable of monitoring all of the receivers within a particular home whether it be one or more, or in many cases be capable of monitoring the receivers in a plurality of homes by recording the tuning conditions at a central office or the like. By way of example there is illustrated in Figs. 1a and 1b of the drawings three wave signal receivers designated generally by the reference numeral 10 characterized by a suitable subscript to distinguish between the receivers. As illustrated in Fig. 1a there are provided wave signal receivers 10a, 10b, and 10c respectively. All of these receivers are indicated diagrammatically although the receiver 10a is shown in slightly more detail. It will be understood that these wave signal receivers may be identical but more than likely they will be quite different with one of the receivers probably being a console model while the others might be small table models or even a portable radio. Each of the receivers is indicated as comprising an antenna ground circuit 11 and signal reproducer or loud speaker 12. As was mentioned above although these receivers are likely to be of the superheterodyne type it is not essential as far as the present invention is concerned that they be of this type. By way of example it is assumed that all of these receivers are located in a single home and connected to the house wiring circuit 25 which is illustrated with dashed line portions to indicate that the receivers 10a, 10b and 10c are located remotely from each other. However, the present invention is equally applicable to arrangements where the receivers are located in different homes and the recorder at a central office, the only different consideration being the links, space or otherwise, interconnecting the portions of the system since in the latter case no common house wiring circuit is available. However, a space link or telephone lines could be employed in such a situation.

Referring now to wave signal receiver 10a which is representative of the receivers 10b and 10c it is illustrated as including a power supply unit generally indicated at 13 which is connected by means of a plug connector 14 with a suitable source of power. The power supply unit 13 includes the conventional on-off switch which preferably is combined with the manual volume control means in the conventional manner. As illustrated the control knob 15 controls the on-off switch comprising the contacts 16 and 17 which are connected in series with a suitable winding 18, which may comprise a primary winding of a suitable transformer. The receiver 10a is also illustrated as comprising a conventional tuning knob 19 which is mounted on a suitable tuning shaft for controlling the position of the resonant frequency varying means such as the ganged condensers if condenser tuning is employed or the position of the iron cores if permeability tuning is employed. It will be understood that the tuning shaft might be positioned by push buttons or push buttons might be employed to control the tuning condition of the wave signal receiver without in any way affecting the position of a rotatable tuning shaft. As will become apparent from the following description the present invention is readily applicable to push button operated receivers whether they control the position of the tuning shaft or not.

If the wave signal receiver employs a tuning shaft which is positioned at various positions whenever the receiver is tuned to transmitting stations whose signal is receivable by said receiver, it will be apparent that the position of the tuning shaft will be indicative of the tuning condition of the receiver. Experience has shown that with a very high percentage of receivers a mechanical link can be connected to the dial drum. For the purpose of simplifying the disclosure, the present invention has been specifically illustrated in that connection.

Since, as has been pointed out above, the recording and translating equipment which is fairly sensitive and somewhat bulky apparatus is located at a point remote from the receivers such as 10a it is necessary to provide at each receiver apparatus which is capable of transmitting to a remote point information pertinent to the tuning condition of the associated receiver. In accordance with the present invention this apparatus is very small and compact so that it may be disposed in the available cabinet space of most receivers. As illustrated each wave signal receiver such as 10a, 10b, and 10c has associated therewith an apparatus provided in accordance with the present invention which may be referred to as a receiver attachment. These receiver attachments are designated by the reference numerals 20a, 20b and 20c for the receivers 10a, 10b and 10c, respectively. The receiver attachment 20a is shown in detail in Fig. 1a of the drawings and essentially comprises three units as follows: a power supply unit 22, an audio oscillator 23, and an oscillator 24 which may be a radio frequency oscillator when the receivers are all located in a single home, but which might also comprise an ultra high frequency oscillator where the receivers in different homes are monitored and a record produced at a central office. The power supply unit 22 is preferably connected to a source of alternating current such as the house wiring circuit generally designated by the reference numeral 25 through a suitable plug connector 26. In order that the receiver attachment 20a is energized only when the receiver 10a is turned on (and similarly for the receiver attachments 20b and 20c) there is provided in the power supply unit 22 a relay 27 having its winding 28 connected in series with the combined volume control and on-off switch 15, 16 and 17 of the wave signal receiver 10a. Consequently whenever the wave signal receiver 10a is turned on the flow of current to the receiver through the plug connectors 26 and 14 causes relay 27 to be energized to close its normally open contacts 27a. It will be apparent that with the arrangement described the receiver attachment 20a may be applied to the receiver 10a as far as the electrical circuit thereof is concerned merely by removing one portion of the plug connector 14 from the conventional power circuit and instead applying the corresponding portion of the plug connector 26 of the power supply unit 22 to the power circuit and connecting the plug connector 14 as shown in Fig. 1a of the drawing.

The contacts 27a of the relay 27 are illustrated as controlling the energization of the primary winding 30 of a transformer 31 including secondary windings 32 and 33 respectively. The secondary winding 32 preferably supplies the filament voltage for the electron discharge valves employed in the receiver attachment 20a. The secondary winding 33 on the other hand is connected to the anodes of a twin diode 34 connected in the circuit of a full wave rectifier so as to provide at the terminals 35 and 36 between which there is provided a resistor 37, a direct current potential suitably filtered as by means of a filtering unit 38.

For the purpose of providing a signal uniquely representative of the tuning condition of the wave signal receiver associated therewith such as the wave signal receiver 10a there is provided an audio oscillator 23 which may be any suitable form of audio oscillator but which has been specifically illustrated as an RC oscillator of the Wien bridge type. As illustrated the audio oscillator 23 is very similar to that disclosed in the August 1946 issue of Radio News, pages 38 to 40, entitled "Audio oscillators," by J. C. Hoadley. The RC or Wien bridge oscillator 23 operates directly at audio frequencies. As illustrated it comprises a two-stage audio amplifier including triodes 40 and 41 respectively and a resistance-capacitance bridge generally referred to as an RC bridge, which is at the same time regenerative and degenerative. The RC bridge comprises the capacitors 42 and 43 which are preferably identical in rating and two sets of resistors generally designated by the reference numerals 44 and 45, one resistor from each set being adapted to be selectively rendered effective at any one time. The set of resistors 44 which are in a sense arranged in parallel, but only one of which is effective at any one time, are specifically designated as 44a, 44b, 44c, 44d, 44e, 44f, 44g, 44h, 44i and 44j. Similarly the resistors 45 are designated as 45a, 45b, 45c, 45d, 45e, 45f, 45g, 45h, 45i and 45j respectively. The resistors marked with the same subscript preferably have identical values of resistance but the resistors having different subscripts differ from each other and as schematically illustrated have increasing values of resistance as the subscripts change from a to j. One terminal of each of the resistors 44a to 44j inclusive is connected to a common terminal and to one terminal of the capacitor 43. As illustrated this terminal is grounded as indicated at 46 through a suitable capacitor 47. The other ends of the resistors 44a to 44j are respectively connected to spaced contact members 48a, 48b, 48c, 48d, 48e, 48f, 48g, 48h, 48i and 48j. Similarly the resistors 45a to 45j inclusive have a common terminal which is connected to one terminal of the capacitor 42. The other terminals of the resistors 45 are connected to spaced contact members 49a, 49b, 49c, 49d, 49e, 49f, 49g, 49h, 49i, and 49j which are disposed in a linear relationship opposite the corresponding contact members 48a, 48b, 48c, 48d, 48e, 48f, 48g, 48h, 48i and 48j so as to be engageable by a suitable sliding switch contact 50, the contacts with similar subscripts being simultaneously engaged. The sliding contact 50 is furthermore adapted to be connected by a flexible conductor 51 to the other terminal of the capacitor 43. The other terminal of the capacitor 42 is connected through a suitable adjustable resistor 53 with the cathode of the triode 40. The resistor 53 is preferably a feed back resistor which is adjustable so that the feed back may be adjusted to an optimum value. The flexible terminal 51 is also connected to the control electrode of the triode 40.

In order than an audio frequency is producible by the audio oscillator 23 when the sliding switch contact 50 is not in engagement with any of the associated contacts 44 and 45 there are provided a pair of resistors 52a and 52b which are connected in parallel with the particular resistors 44 and 45 rendered effective by the sliding switch contact 50. These resistors are preferably relatively large to insure an audio frequency output of 40 cycles, for example, if no other pair of resistors 44 and 45 are connected into the RC circuit.

For the purpose of improving the stability of the audio oscillator 23 there is preferably provided in the cathode circuit of the triode 40 a resistor 54 in the form of a low wattage lamp whose resistance varies with temperature. When the triode 40 attempts to draw more current the temperature of the lamp 54 increases, thereby effectively increasing the bias on the triode 40 and increasing the degenerative effect. Consequently the resistor or lamp 54 tends automatically to hold the output of the oscillator constant and the distortion to a low value. The anode of the triode 40 is preferably connected to the terminal 36 of the power supply unit 22 which effectively is a source of +B potential through a voltage dropping resistor 55. This voltage dropping resistor 55 is preferably proportioned so that the average current flowing through the lamp or resistor 54 falls on the knee of the lamp's temperature resistance characteristic whereby the desired stabilizing effect occurs. The plate circuit of the triode 40 is connected by a suitable coupling condenser 56 to the control electrode of the triode 41. The anode of the triode 41 is connected by a coupling capacitor 57 with the RC bridge and specifically with the terminal of the condenser 42 connected to the adjustable resistor 53. The cathode of the triode 41 is grounded as indicated through a resistor 58. A suitable grid leak for the triode 41 is provided by means of the resistor 59. The coupling capacitor 56 should be large if it is desired to maintain oscillation at low frequencies. Similarly coupling capacitor 57 must be very large as it works into a very low resistance composed of the resistors 53 and 54 connected in series. Preferably the capacitor 57 is an electrolytic condenser and works satisfactorily in view of the fact that the direct current polarizing voltage is higher thtan the alternating current voltage it must handle. The anode of the triode 41 is connected to the source of +B potential or in other words to the terminal 36 of the power supply unit 22 through a suitable voltage dropping resistor 60. The output of the audio frequency oscillator is illustrated as being obtained from the cathode circuit of the triode 51 and is supplied through a coupling capacitor 61.

It will be understood that the output frequency of the audio oscillator 23 may be controlled by varying the capacitance of the capacitors 42 and 43 or the resistance of the resistors 44 and 45 or both. When the capacitors 42 and 43 are equal and the particular resistors 44 and 45 which are rendered effective by the movable switch arm 50 are equal, and the resistors 52a and 52b are equal, then the frequency of the output of the audio oscillator may be given by the following expression:

$$F = \frac{1}{2\pi RC}$$

where R is the value in ohms of the parallel resistance circuit comprising the resistor 52a and the particular resistor 44 which is rendered effective as for example the resistors 44h for the position indicated in Fig. 1a of the drawings, and C is the capacitance in farads. If none of the resistors 44 and 45 are rendered effective for a particular setting it will be apparent that R will comprise the resistance of the resistor 52a. For the purposes of the present invention the resistors 44j and 45j preferably have a value such that the output frequency of the audio oscillator is approximately 1000 cycles and the resistance of the other resistors are decreased in value so that the frequency steps at the output of the audio oscillator 23 differ from each other by about one and one half kilocycles with the highest frequency being produced when the resistors 44a and 45a are rendered effective. When only the resistors 52a and 52b are effective a low frequency of the order of 40 cycles or the like appears at the output of the audio oscillator which is indicative of tuning the wave signal receiver 10a to a station for which no channel is provided in the receiver attachment 20a or in other words to what may be termed tuning to "all other stations."

For the purpose of controlling the output frequency of the audio oscillator 23 in dependence upon the tuning condition of the associated wave signal receiver 10 the slidable contact switch 50 which engages with the contacts 48 and 49 is connected by suitable means, such as a Bowden wire or the like generally indicated by the reference numeral 63, with the manual tuning knob 19 or the tuning shaft so that if the tuning condition of the wave signal receiver 10 is changed the resistances in the RC bridge of the Wien bridge oscillator 23 are selectively changed and consequently the output frequencies of the audio oscillator are varied. Although the contacts 48 and the contacts 49 are schematically illustrated in fixed positions in Fig. 1a of the drawings, it will be understood that these contacts are adjustably spaced so that any desired channels may be chosen within the limit of the number provided for by the contacts 48 and 49. It will be understood that any suitable means for providing adjustable positioning of the contacts 48 and 49 may be employed. One arrangement for accomplishing this is disclosed in Figs. 2 and 3 of the drawings where the corresponding parts are designated by the same reference numerals as in the preceding figures. As illustrated the switch comprising the slidable contact 50 and the relatively stationary contacts 48 and 49 includes an insulating base 180 having defined therein a plurality of elongated recesses 181 and 182. The longitudinally extending edges of the recesses 181 and 182 are serrated as shown at 183 in Fig. 2 of the drawings. Preferably the base 180 is molded from suitable insulating material and the serrations 183 along the edges of the recesses 181 and 182 are formed during this molding process. The contacts 48 and 49 are indicated as being provided with cooperating serrations along the ends thereof so that they may be positioned at any place along the recesses 181 and 182 respectively. The cooperating serrations prevent movement of the contacts 48 and 49 in a direction along the longitudinal axis of these recesses. To retain the contacts 48 and 49 in any desired position a pair of insulating retaining bars or clamping blocks 184 and 185 are provided which clampingly hold the contacts in position as is clearly shown in Figs. 2 and 3 of the drawings. Preferably the clamping blocks 184 and 185 are held to the base 180 by suitable screws 186. A sufficient portion of each of the contacts 48 and 49 is exposed so as to be engageable by the slidable contact 50. As illustrated the contacts 48 and 49 extend very slightly above the top surface of the base 180 to insure good electrical contact with the sliding switch contact 50.

To further insure proper engagement of the sliding contact 50 with the contacts 48 and 49, the base 180 is preferably provided with an elongated slot 187 for receiving a suitable bolt 188 extending through the sliding contact 50. A suitable resilient means 189 engaging along the bottom of the base 180 supplies the desired contact pressure as is obvious from Fig. 3 of the drawings. The slidable contact 50 is connected with the Bowden wire 63 referred to above.

It should be understood that in the event that the wave signal receiver 10a is provided with push buttons suitable means may be provided to insure the connection of the proper resistances 44 and 45 in the RC bridge of the audio oscillator 23 in dependence upon the particular push button which is actuated. Although ten frequency steps are illustrated for the audio oscillator 23 exclusive of the "all other" stations frequency condition, it will be apparent that a larger or smaller number may be employed depending upon the number of stations to which the wave signal receiver 10 is normally tuned. It will furthermore be understood that the various frequency steps of the audio output of the oscillator 23 may be representative of channels in the AM, FM, or television bands or a combination thereof so that the tuning condition of the wave signal receiver, regardless of the band to which it is tuned, will be indicated by a predetermined audio frequency output of the audio oscillator 23.

Figure 2:
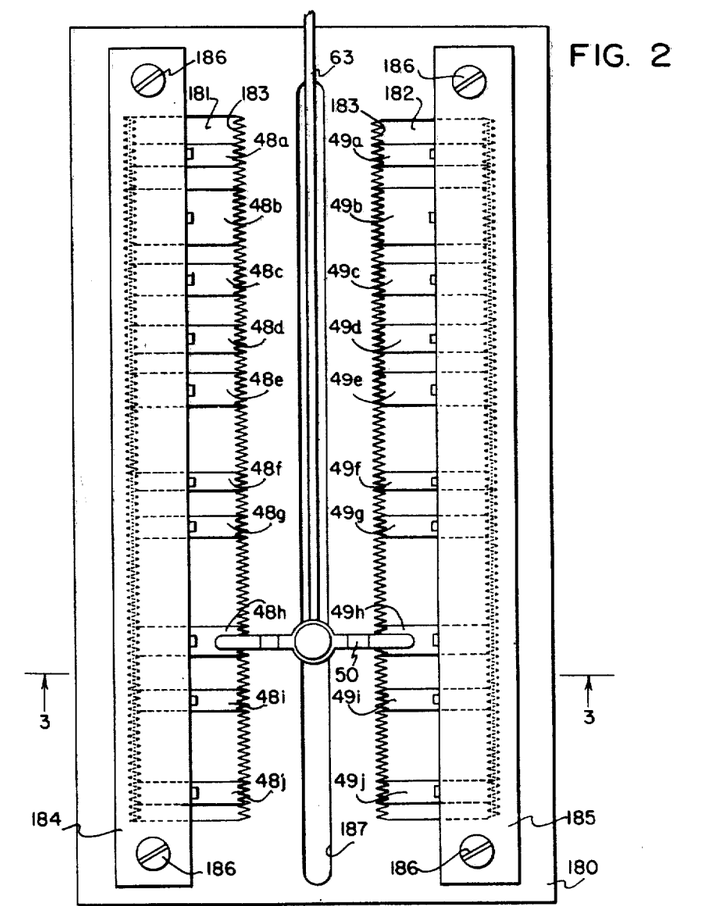
Fig. 2 is an enlarged view setting forth certain details of a portion of Fig. 1a of the drawings.
Figure 3:
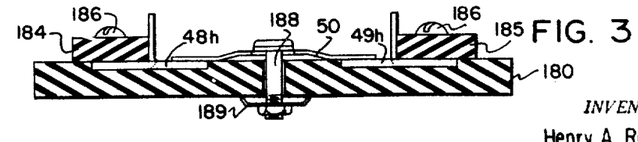
Fig. 3 is a sectional view taken on line 3—3 of Fig. 2.

It will be understood by those skilled in the art that the apparent band width for particular channels in the various frequency bands of the radio frequency spectrum as viewed at the receiver vary considerably particularly in the standard broadcast band. This is due to both the selectivity curve of the receiver and the non-linearity of the resonant frequency varying means of the receiver. Thus with some receivers having a poor selectivity curve a particularly strong transmitting station having a band width of 10 kc. may appear on the receiver dial to have a band width of 50 or more kc. It is of course essential that regardless of the position of the tuning shaft, for example, of the receiver when tuned to such a station having a wide apparent band width, that the same audio output at the oscillator 23 be provided for any position of the tuning shaft that the signal from the particular channel tuned in by said receiver can be received. In accordance with the present invention variable width contacts are provided which are represented schematically in Fig. 1a of the drawings. It will be understood that any suitable arrangement for obtaining variable width contacts may be employed. As illustrated in Fig. 2 of the drawings the contacts 48 and 49 are constructed in variable widths and the proper width is chosen for the particular contact so as to conform with the apparent band width of the station as viewed at the receiver which is represented by the particular contact. Consequently, where the tuning shaft of the receiver may be moved over quite an angle while the receiver remains tuned to the same station, wide contacts such as 48b and 49b are chosen for the associated channels in the audio oscillator 23. On the other hand, where the tuning shaft of the receiver can be moved over only a very small angle and still remain tuned to the same station, very narrow contacts such as 48f and 49f are chosen for the associated channels in the audio oscillator 23. In other words the switch comprising the spaced linearly arranged contacts 48 and 49 and the sliding contact 50 is designed to insure the proper audio frequency output for all positions of the tuning shaft of the receiver 10a that the particular channels provided for in the receiver attachment 20a can be received. It should be understood that the switch comprising the sliding contact 50 and the stationary contacts 48 and 49 might take various forms. A suitable switch for this purpose is disclosed and claimed in a copending application of Fred Krahulec, Serial No. 78,926 filed March 1, 1949, and assigned to the same assignee as the present application.

With the arrangement described thus far the different tuning conditions of the wave signal receivers 10a, 10b and 10c are represented by different predetermined audio frequencies each different audio frequency being indicative of a different tuning condition of the associated wave signal receiver. In order that a record may be produced at a remote point of the particular output frequency of the audio oscillators associated with each receiver so as to identify the receiver as well as the tuning condition thereof, each receiver attachment is also provided with an oscillator 24 which is capable of producing a signal uniquely representative of the particular receiver. This oscillator may be an ultra high frequency oscillator or where the receivers being monitored are in a single home, a radio frequency oscillator capable of producing a radio frequency. The oscillator 24 is referred to hereinafter as a radio frequency oscillator but it should be understood that this is by way of example only and it might equally well comprise an ultra high frequency oscillator where this is desirable. As illustrated the radio frequency oscillator 24 which is preferably identical for each receiver attachment comprises an electron coupled oscillator including the pentode 65 having an anode 66, a cathode 67, a control electrode 68, a screen grid 69 and a suppressor grid 70. The anode 66 of the pentode 65 is connected to a source of +B potential, which is the terminal 36 of the power supply unit 22, through a radio frequency choke coil 71 and a voltage dropping resistor 72. This plate circuit of the pentode 65 is also connected by means of a coupling capacitor 73 with a suitable antenna 74 if the signal from the receiver attachment 20a is transmitted by space link to a suitable recorder unit. It should be understood however that the output of the plate circuit of the radio frequency oscillator 24 might be connected by some other link such as for example the power circuit 25 or other suitable means to the remote point where the recorder to be described hereinafter is located. Preferably when the recorder is located in the multi-receiver home the space link or the power circuit comprising the conductors 25 are employed since these schemes eliminate the requirement of any additional conductors connected between the receiver attachment and the remote recording point. Where the recorder is located at a central office an ultra high frequency space link may be employed, or if desired, telephone wires.

For the purpose of producing a radio frequency signal the radio frequency oscillator 24 comprises a tank circuit 76 including the inductance 77 and a plurality of capacitors 78a, 78b, 78c and 78d respectively adapted to be selectively connected in parallel with the inductance 77 by means of an adjustable switch 79. In other words the capacitors 78 are arranged in parallel with one common terminal of all of the capacitors connected to one terminal of the inductance 77 and the other terminals of the capacitors 78a, 78b, 78c, and 78d being connected to respective contacts 80a, 80b, 80c and 80d arranged so as to be engaged by movable switch arm 79. Preferably the value of the capacitors 78 is such that the frequency output of the radio frequency oscillator 24 may be adjusted to either two, three, four or five megacycles depending upon which of the contacts 80a, 80b, 80c or 80d is engaged by the switch arm 79. One terminal of the tank circuit 76 is connected by means of a capacitor 81 with the control electrode 68 of the pentode 65. The cathode 67 is connected to a suitable tap 77a on the inductance 77 and a grid leak resistor 82 is connected across the triode to cathode circuit of the pentode 65. The screen grid 69 is connected to the source of + B potential through a suitable voltage dropping resistor 83. A by-pass condenser 84 to ground is also connected to the screen grid 69. The suppressor grid 70 is grounded as indicated at 85. Any suitable means for modulating the radio frequency output of the RF oscillator 24 with the audio frequency output of the audio oscillator 23 may be provided. As illustrated a suitable coupling transformer 87 is interposed between the coupling capacitor 81 and the control electrode 68 of the pentode 65. A suitable radio frequency choke coil 88 prevents the radio frequency from affecting the audio oscillations. The radio frequency by pass condensers 89 and 90 are provided to ground both ends of the choke coil 88 for radio frequencies.

From the above description it will be apparent that the oscillator 24 produces a carrier signal which is modulated with the audio frequency output of the audio oscillator 23. By employing a radio frequency within the frequency range of 1.8 to 5 megacycles, operation in a band which will cause a minimum of difficulty from the standpoint of the F. C. C. regulations is provided. The output of the radio frequency oscillator 24 would be initially adjusted with respect to signal strength, radiation, and the like to conform with F. C. C. regulations. It will be noted that the adjustable switch 79 for the receiver attachments 20a, 20b and 20c is set at different positions whereby it is readily possible to determine from the frequency of the transmitted radio frequency signal which receiver is responsible. In other words means are provided for producing a modulated radio frequency signal indicative not only of the tuning condition of the receiver but also uniquely representative of a particular receiver. If an ultra high frequency oscillator is provided the signal may be beamed in the desired direction and in this frequency range no difficulty with the F. C. C. regulations should be encountered.

For the purpose of producing a record of the frequency output of the audio oscillators 23 associated with each of the receiver attachments 20a, 20b, and 20c with respect to time, so as effectively to produce a record of the tuning condition of the wave signal receivers 10a, 10b, and 10c at all times, there is provided a recording unit and associated equipment generally indicated by the reference numeral 95 and designated as the central station. The term "central station" is employed since the recording equipment for a plurality of receivers such as 10a, 10b, 10c and the like is located at a central point preferably remote from the receivers at a suitable inconspicuous place in the home such for example as the basement, a closet, the attic or the like, or even at a central office remote from the home whereby the receivers in a plurality of homes may be monitored. Whereas the equipment in the receiver attachments is very compact, particularly when midget tubes are employed as well as dual tubes wherever this is possible (the tubes 40 and 41 are preferably midget triodes combined in a single envelope such for example as the 6J6), the equipment at the central station need not be confined in a small space and furthermore may comprise equipment which is delicate and which should not be subjected to jars and the like due to moving the equipment around.

Essentially the central station 95 comprises a plurality of fixed tuned radio frequency amplifier-detector units preferably referred to as fixed tuned receivers, one for each of the wave signal receivers being monitored or metered. Since three wave signal receivers 10a, 10b and 10c have been described the central station 95 is provided with three fixed tuned receivers 96a, 96b and 96c respectively which are identical except for the frequency to which these receivers are tuned. It will be understood that the fixed tuned receiver 96a will be tuned to receive only the frequency of the radio frequency oscillator 24 in the receiver attachment 20a while the fixed tuned receivers 96b and 96c will be tuned respectively to receive only the radio frequency outputs of the oscillators 24 associated with the receiver attachments 20b and 20c which by virtue of the adjustment of the switch arm 79 are set at different frequency values. In addition to the fixed tuned receivers 96a, 96b and 96c, the central station 95 further includes a step-tuned audio frequency amplifier and translating unit generally designated by the reference numeral 97 and a recording unit generally indicated at 98.

Since the fixed tuned receivers 96a, 96b and 96c are all identical only the fixed tuned receiver 96a will be described in detail and the corresponding parts of the other receivers when illustrated will be designated by the same reference numerals marked with the same subscript as that associated with the reference numeral 96 for the particular receiver. As illustrated the fixed tuned receiver 96a comprises an input circuit specifically illustrated as an antenna ground circuit 99a. It will be understood that if the antenna 74 of the receiver attachments 20a, 20b and 20c are dispensed with and instead of a space link the output of the radio frequency oscillators 24 is impressed directly on the house wiring circuit 25, then the antenna-ground circuits 99a, 99b and 99c would also be dispensed with and instead the input circuits for the fixed tuned receivers 96a, 96b and 96c would be connected directly to the house wiring circuit 25. The antenna-ground circuit 99a for the fixed tuned receiver 96a is connected to a tuned circuit 100 which in turn is coupled to a tuned circuit 101 connected to the input of an electron discharge valve 102 in the form of a triode acting as a radio frequency amplifier. The plate circuit of the triode 102 is connected to a source of +B potential indicated as 103 through a tuned circuit 104. The tuned circuit 104 is furthermore coupled to a tuned circut 105 connected in the input circuit of a triode 106 which also functions as a radio frequency amplifier and whose plate circuit is connected to a source of +B potential also designated by the reference numeral 103 through the tuned circuit 107. It will be understood that the tuned circuits 100, 101, 104, 105 and 107 are fixed tuned circuits tuned to the frequency of the radio frequency oscillator 24 in the particular receiver attachment with which the fixed tuned reeciver is associated. For the fixed tuned receiver 96a these tuned circuits are tuned to the frequency of the RF oscillator 24 of the receiver attachment 20a, which as was pointed out above might be a frequency of two megacycles. The tuned circuits in the fixed tuned receivers 96b and 96c would preferably be tuned to a frequency of three and four megacycles respectively, or some other suitable values in the 1.8 to 5 megacycle frequnecy range.

The fixed tuned receiver 96a further includes an electron discharge valve 109 in the form of a diode-triode, the diode section functioning as a detector and being coupled to the tuned circuit 107 by means of an inductance 110. The detector section of the electron discharge valve 109 will cause the modulation components of the modulated radio frequency output of the oscillator 24 of the receiver attachment 20a to appear across the resistor 111 connected in series with the plate to cathode circuit thereof. The control electrode of the triode section of the electron discharge valve 109 is connected to one terminal of the resistor 111 so as to apply a negative bias thereto when modulation components are detected by the diode section of the valve 109. The plate circuit of the triode section of the valve 109 is connected to the source of +B potential again designated by the reference numeral 103 through the winding of a suitable control relay designated by the reference numeral 112a. It will be apparent therefore that a current continually flows through the winding of the relay 112a and the plate circuit of the triode section of the valve 109 as long as no substantial negative bias due to detection of the modulation components of the modulated carrier signal appears across the resistor 111. The relay 112a is therefore normally energized and is so indicated in Fig. 1b of the drawings. Only upon the receipt of a carrier having a frequency which the fixed tuned receiver 96a is capable of receiving does a voltage appear across the resistor 111 which causes a sufficient decrease in the current flowing in the plate circuit of the triode section of the valve 109 to cause the relay 112a to be denergized to close its two sets of normally open contacts 113a and 114a.

The detected audio voltage appearing at the plate circuit of the triode section of the electron discharge valve 109 is connected through a suitable coupling capacitor 115a to the input of an audio frequency amplifier comprising the electron discharge valve 116a, whose control electrode is connected to one terminal of the coupling capacitor 115a. The cathode of the electron discharge valve 116a is grounded through a suitable resistor 117a and the anode is connected to a source of +B potential designated by the reference numeral 103 through a suitable voltage dropping resistor 118.

The fixed tuned receivers 96b and 96c are identical with the fixed tuned receiver 96a and similarly include relays 112b and 112c respectively and audio frequency amplifiers comprising electron discharge valves 116b and 116c respectively.

As illustrated the plate circuits for all of the audio frequency amplifiers comprising the electron discharge valves 116a, 116b and 116c are connected in parallel to the source of +B potential 103 through the single voltage dropping resistor 118.

From the above description it will be apparent that when the wave signal receivers 10a, 10b and 10c are turned off no radio frequency signal from the oscillators 24 in the respective receiver attachments is received at the central station 95 and consequently the relays 112a, 112b and 112c remain energized to maintain open (as illustrated in Fig. 1b of the drawings) their normally open contacts 113 and 114, designated with appropriate subscripts. Under these conditions no audio frequency signal is applied to the audio frequency amplifiers comprising the valves 116a, 116b or 116c. Whenever one or more of the wave signal receivers 10a, 10b and 10c is turned on however, an audio frequency output will be produced by one or more of the audio frequency oscillators 23 which frequency will either be indicative of one of the ten channels represented by the variable resistors 44 and 45, or indicative of tuning of the associated receiver to what is termed "all other stations." Consequently the turning on of any receiver 10a, 10b or 10c will cause its associated receiver attachment to produce a modulated radio frequency signal which will render the associated fixed tuned receiver 96 effective to deenergize its associated relay 112 with the result that the associated contacts 113 and 114 are closed. Also the demodulated audio frequency signal will appear in the parallel connected plate circuits of the electron discharge valves 116.

For the purpose of producing a record indicative of the tuning condition of the wave signal receivers 10a, 10b or 10c or any others which might be provided the step-tuned audio frequency amplifier 97 and recorder unit 98 are provided. As illustrated the step-tuned audio frequency amplifier and translating unit 97 comprises a pair of electron discharge valves 120 and 121 arranged in cascade in the form of a two-stage step-tuned amplifier. As illustrated each of the electron discharge valves 120 and 121 is in the form of a pentode comprising anodes 122, cathodes 123, control electrodes 124, screen grids 125 and suppressor grids 126. The control electrode 124 of the electron discharge valve 120 is connected to the output of the parallel arranged audio frequency amplifiers 116a, 116b, and 116c through a suitable coupling capacitor 128 and a potentiometer 129 in the form of a resistor having one terminal grounded and the other terminal connected to the coupling capacitor 128. A variable tap on the potentiometer 129 permits appropriate adjustment of the magnitude of the audio frequency voltage applied to the control electrod 124 of the electron discharge valve 120 comprising the first stage of the two-stage step tuned amplifier. The suppressor grid 126 of each pentode 120 and 121 is connected to its associated cathode 123 which in turn is grounded through a suitable resistor 130. The screen grids 125 of each of the electron discharge valves 120 and 121 are connected to the source of + B potential 103 through their respective voltage dropping resistors 131. + B potential from the source 103 is supplied to each plate 122 through suitable respective inductances 132. The plate circuit of the pentode 122 is also coupled to the control electrode 124 of the pentode 121 through a suitable coupling capacitor 133. The control electrode 124 is provided with a suitable grid leak resistor 135.

For the purpose of providing tuned circuits for each of the stages of the audio frequency amplifiers comprising the electron discharge valves 120 and 121 the inductances 132 of each stage are adapted to be paralleled by respective suitable capacitors designated for each stage by the reference numerals 135a, 135b, 135c, 135d, 135e, 135f, 135g, 135h, 135i, 135j and 135k. All of these capacitors for each stage have a common terminal which is connected to one terminal of the associated inductance 132. The other terminals of the capacitors 135a to 135k inclusive are connected to a plurality of contacts arranged in equally spaced relationship about a portion of the circumference of a circle. These contacts are designated by the reference numerals 140a, 140b, 140c, 140d, 140e, 140f, 140g, 140h, 140i, 140j, and 140k, which together with the contacts 140m, 140n and 140p are arranged in equally spaced relationship in the form of a semicircle as is clearly indicated in Fig. 1b of the drawings. A rotary switch arm 141 is adapted to successively engage the contacts 140a to 140p inclusive in that order during a half cycle of rotation. The values of the capacitors 135a to 135j are chosen so as to provide with the associated inductance 132 a plurality of tuned circuits, each corresponding to a different one of the audio frequencies produced by virtue of the resistances 44a to 44j and 45a to 45j respectively, and the step-tuned audio frequency amplifier units comprising the discharge valves 120 and 121 will successively pass audio frequency signals capable of being produced by the audio oscillators 23 as the appropriate capacitors 135 are rendered effective by the rotary switch arms 141. In other words, during each cycle of rotation, which preferably is once per minute all of the frequencies capable of being produced by the audio oscillators 23 are capable of being passed by the step tuned audio frequency amplifier unit 97 at the instant that the appropriate contacts are engaged by the rotating switch arms 141. The switch arms 141 of each of the step-tuned amplifier stages are interconnected by a suitable shaft designated by the reference numeral 143 which is drivingly connected to a syncnronous motor unit 144 preferably capable of driving the switch arms 141 at one revolution per minute. The capacitors 135k and associated contacts 140k are provided to permit tuning of the step-tuned amplifier unit 97 to the frequency produced by the audio oscillators 23 when the associated receivers are tuned to "all other stations."

It will be apparent that unless one or more of the wave signal receivers 10 are turned on there is no necessity for the step-tuned amplifiers described above to be effective. Accordingly the synchronous motor 144 is normally deenergized and is only energized when one or more of the wave signal receivers 10 are turned on. Accordingly the contacts 114a, 114b and 114c of the associated relays 112a, 112b and 112c are connected in parallel with each other and the parallel arranged contacts are connected in series with the power supply from the house wiring circuit 25 to the synchronous motor unit 144. When any one of the relays 112a, 112b or 112c is deenergized indicating the receipt of a carrier signal by one or more of the fixed tuned receivers 96, the synchronous motor unit 144 is energized. The synchronous motor unit 144 furthermore drives through the shaft 143 a rotary switch arm 146 substantially identical with the rotary switch arms 141 capable of successively engaging a plurality of spaced contacts 147a, 147b, 147c, 147d, 147e, 147f, 147g, 147h, 147i, 147j, 147k, 147m, 147n, and 147p in an identical manner with the contacts 140 marked with corresponding subscripts. These contacts correspond exactly to the contacts 140 and are arranged along the circumference of a half circle so as to be successively engaged during one half cycle rotation of the switch arm 146. The contacts 140m, 140n and 140p have no function and are not connected to anything as indicated in the drawings but correspond to the contacts 147m, 147n and 147p which contacts form a part of the apparatus for designating whether one or more of the wave signal receivers 10 are turned on.

The amplified audio frequency at the output of the two-stage step-tuned audio frequency amplifier is coupled by means of a coupling capacitor 148 to the diode section of an electron discharge valve in the form of a diode-triode 150 so as to rectify any audio frequency appearing at the output of the step-tuned audio frequency amplifiers. The cathode of the diode triode electron discharge valve is grounded through a suitable resistor 151, and the control electrode of the triode section is connected to the cathode so as to be supplied with a positive bias when a suitable signal is detected by the diode section thereof. The triode section consequently acts as a direct current amplifier and the plate circuit is connected to a source of direct current +B potential designated by the reference numeral 103 through the winding 154 of a relay 155 having normally open contacts 156. Whenever an audio frequency signal is detected by the diode section of the valve 150, sufficient current flows through the winding 154 of the relay 155 so as to close the contacts 156. The contacts 156 are adapted to connect the contacts 147a to 147k inclusive to ground.

Any suitable recorder may be provided to record the tuning conditions of the wave signal receivers 10a, 10b and 10c. As illustrated, the recorder 98 comprises a movable recording or record receiving element 160, which is illustrated as a tape having sprocket holes adjacent the edges thereof adapted to be engaged by a suitable sprocket 161 which is driven by a synchronous motor 162 continuously connected to a suitable source of potential. The synchronous motor 162 is connected to the sprocket 161 by means of the shaft 163. Preferably the synchronous motor 162 is energized from the house wiring circuit 25 at all times regardless of whether or not other parts of the apparatus at the central station 95 are energized, thereby insuring continuous movement or at least movement in a predetermined manner with respect to time of the record receiving element 160. The recorder 98 also includes the tape supply spool 165 and the take up spool 166 together with suitable means for maintaining the tape in a taut condition.

The means for producing a record or trace on the recording element 160 is illustrated as comprising a stylus 167 which is supported for arcuate movement on a pivot 168 so that the inscribing portion 167a is adapted to move transversely of the tape or record receiving element 160. The stylus 167 is connected by means of a suitable link 169 and a crank 170 with the shaft 143 of the synchronous motor unit 144. It will be apparent that with this arrangement the position transversely of the record receiving element 160 of the inscribing portion 167a of the stylus 167 will correspond to the position of the switch arms 141 and 146 with reference to their particular contacts 140 and 147. As far as the contacts 140a to 140k are concerned the position of the stylus 167 will correspond to a particular frequency produced by the audio frequency oscillators 23 described above and consequenty to a particular tuning condition of one or more of the wave signal receivers 10a, 10b and 10c.

The inscribing portion 167a is normally not in contact with the record receiving element 160. In order to produce a trace the stylus pivot point 168 is supported on a movable carriage 173 mounted for limited movement about a pivot 172. A suitable spring 174 biases the carriage 173 in such a manner that the inscribing portion 167a is not in trace producing engagement with the recording element 160. A portion of the carriage 173 forms the armature of an electromagnet comprising a winding 176. One terminal of the winding 176 is connected to the source 103 of +B potential while the other terminal is connected by the conductor 177 with the switch arm 146. With this arrangement it will be apparent that whenever the contacts 156 are closed and the switch arm 146 is in a position to contact one of the contacts 147a to 147k inclusive the inscribing portion 167a may be caused to engage in a trace producing manner the movable record receiving element 160. It will be apparent that with this arrangement the record receiving element 160 will be channelized into equally spaced channels as indicated by the fine parallel lines numbered 1 to 10 corresponding to the ten stations to which the wave signal receivers 10a, 10b and 10c are likely to be tuned. The 11th channel marked AO in Fig. 1b of the drawings is representative of the "all other stations" channel.

In order to produce an indication of which wave signal receivers are turned on, a plurality of three additional channels are provided designated as 10a, 10b and 10c respectively which correspond to the contacts 147m, 147n and 147p. The contact 147m is connected to ground through the contacts 113c of the relay 112c. Similarly the contact 147n is connected to ground through the contacts 113b of the relay 112b, and also the contact 147p is connected to ground through the contacts 113a of the relay 112a. Whenever one or more of the relays 112a, 112b or 112c are energized one or more of the contacts 147m, 147n, and 147p are grounded to indicate that one or more of the wave signal receivers 10a, 10b or 10c are turned on. When the stylus 167 is in the position corresponding to the channels 10a, 10b or 10c a trace will be produced depending upon whether or not the associated contacts engageable by the switch arm 146 are grounded through the contacts 113 or one or more of the relays 112. It will be noted that since the contacts 140 and 147 are arranged in a semicircle the stylus 167 can produce a trace while moving in only one direction across the recording element 160 and for the reverse direction of movement no trace will be produced since the switch arms 141 and 146 engage no contacts for this half cycle of rotation.

With this arrangement it is apparent that readily decodable information is obtained. Since the indications of the tuning conditions of the receivers appear on the record receiving element 160 in equally spaced channels, the decoding process is greatly simplified. Only when receivers are simultaneously turned on or turned off will there be any ambiguity as to the interpretation of the record and the rare occurrence of this insures obtaining a readily decodable record at substantially all times.

In view of the detailed description which has been included above the operation of the above described apparatus will be apparent to those skilled in the art. A signal will be produced at each receiver indicative of the tuning condition of the receiver which is transmitted as the modulation component of a suitable carrier. The choice of the carrier frequency immediately acts as a means to identify the particular receiver involved and the audio frequency modulation components are indicative of the station to which the receiver is tuned. By means of a simple apparatus in the form of a step tuned audio frequency amplifier and translating unit a clear and unambiguous record of the tuning condition of one or more wave signal receivers is readily produced with the information contained in equally spaced channels on the recording element. Furthermore, by employing the adjustably variable width contacts of the present invention accurate indications are obtained regardless of the particular position of the tuning shaft of the receiver. It will be apparent that a much larger number of channels than the number illustrated by way of example may be employed which may be indicative of one or more of amplitude modulation, frequency modulation and television signals. Furthermore a recording element in the form of a magnetic tape or other suitable means might equally well be employed.

It will be apparent to those skilled in the art that the present invention is not limited to the particular constructions and arrangements shown and described but that changes and modifications may be made without departing from the spirit and scope of the invention, and it is aimed in the appended claims to cover all such changes and modifications.

What is desired to be secured by Letters Patent of the United States is:

1. In a system for providing an indication of the tuning condition of a wave signal receiver of the type provided with a movable tuning element for conditioning said receiver for signal reception from different transmitting stations operating at different carrier frequencies and wherein said receiver is capable of receiving signals from one of said transmitting stations over a greater increment of movement of said tuning element than others of said transmitting stations whereby said stations appear to have different band widths with resepect to movement of said tuning element, a position switch comprising a common contact member and a plurality of contact means respectively corresponding to different transmitting stations likely to be tuned in by said receiver, driving means actuated by said tuning element for relatively moving said contact member and said contact means to produce engagement of said contact member with a predetermined one of said contact means corresponding to the predetermined one of said transmitting stations to which said receiver is tuned for signal reception, and means for insuring the engagement of said one of said contact means by said contact member for all positions of said element at which signals from said one transmitting station are received by said receiver.

2. In a system for providing an indication of the tuning condition of a wave signal receiver of the type provided with a movable tuning element for conditioning said receiver for signal reception from different transmitting stations operating at different carrier frequencies and wherein said receiver is capable of receiving signals from one of said transmitting stations over a greater increment of movement of said tuning element than others of said transmitting stations whereby said stations appear to have different band widths with respect to movement of said tuning element, a position switch comprising a common movable contact member and a plurality of contact means respectively corresponding to the different transmitting stations likely to be tuned in by said receiver, driving means actuated by said tuning element connected to said contact member for causing said contact member to engage the predetermined one of said transmitting stations when said predetermined one of said transmitting stations is tuned in by said receiver, and means for insuring the engagement of said one of said contact means by said contact member for all positions of said element at which signals from said one transmitting station are received by said receiver.

3. In a system for providing indications of the transmitting stations to which a tunable wave signal receiver is tuned for signal reception, said receiver being provided with a movable tuning element for conditioning said receiver for signal reception from different transmitting stations operating at different carrier frequencies and being capable of receiving signals from at least one of said transmitting stations over an increment of movement of said tuning element which is greater than those increments of movement of said tuning element over which others of said transmitting stations may be received by said receiver, a position switch comprising a common contact member and a plurality of contact means respectively corresponding to different transmitting stations from which signals may be received by said receiver, driving means operated in response to operation of said tuning element for relatively moving said contact member and said contact means to produce engagement of said contact member with the predetermined one of said contact means corresponding to the transmitting station to which said receiver is tuned for signal reception, means for insuring engagement between said one of said contact means and said contact member throughout all positions of said tuning element at which signals from said one transmitting station are received by said receiver, and means selectively controlled by said position switch for producing indications of the transmitting stations to which said receiver is tuned for signal reception.

4. In a system for providing indications of the transmitting stations to which a tunable wave signal receiver is tuned for signal reception, said receiver being provided with a movable tuning element for conditioning said receiver for signal reception from different transmitting stations operating at different carrier frequencies and being capable of receiving signals from at least one of said transmitting stations over an increment of movement of said tuning element which is greater than those increments of movement of said tuning element over which others of said transmitting stations may be received by said receiver, a position switch comprising a movable contact member and a plurality of contact means respectively corresponding to the different transmitting stations from which signals may be received by said receiver, driving means operated in response to operation of said tuning element for moving said contact member to produce engagement of said contact member with the predetermined one of said contact means corresponding to the transmitting station to which said receiver is tuned for signal reception, means comprising a predetermined effective width of said one contact means corresponding to the possible limits of movement of said tuning element at which signals from said corresponding transmitting station are receivable for insuring engagement between said one of said contact means and said contact member throughout all positions of said tuning element at which signals from said one transmitting station are received by said receiver, and means selectively controlled by said position switch for producing indications of the transmitting stations to which said receiver is tuned for signal reception.

5. In a device for providing at a remote point an indication of the tuning condition of a wave signal receiver, means for developing a signal having a plurality of distinct characteristics comprising a plurality of variably positioned contacts, means for selectively rendering effective one of said contacts at a time for developing a corresponding signal having a distinct characteristic, and means for interconnecting said last mentioned means and said wave signal receiver to cause different ones of said contacts to be rendered effective in response to tuning of said receiver to different signal channels, said contacts effectively differing in physical characteristics in accordance with the apparent band widths of the associated channels as viewed at said receiver so that tuning said receiver to any position in any channel for which contacts are provided regardless of the apparent band width of said channel as viewed at said receiver will cause a signal having the associated distinct characteristic to be produced.

6. In a system for providing at a remote point an indication of the tuning condition of a wave signal receiver having a tuning shaft, the combination of means for developing a signal having a plurality of different characteristics including a plurality of contacts, movable means adapted selectively to render said contacts effective, means for interconnecting said movable means with the tuning shaft of said wave signal receiver to cause different ones of said contacts to be rendered effective and different characteristics to be produced in response to tuning of said receiver to different signal channels, the particular characteristic produced at any time being dependent on the channel to which said receiver is tuned, said contacts differing in effective physical size in accordance with the apparent band width of the associated channel as viewed at said receiver so that tuning said receiver to any position in any channel for which contacts are provided regardless of the band width of said channel will cause a signal having the particular associated characteristic to be produced.

HENRY A. RAHMEL.

No references cited.